United States Patent

[11] 3,547,289

| [72] | Inventor | Chester R. Steele<br>Sherman, Tex. |
|---|---|---|
| [21] | Appl. No. | 739,397 |
| [22] | Filed | June 24, 1968<br>Continuation-in-part of Ser. No. 681,670,<br>Nov. 9, 1967, Patent No. 3,460,695 |
| [45] | Patented | Dec. 15, 1970 |
| [73] | Assignee | Swing Co., Inc.<br>Sherman, Tex.<br>a corporation of Texas |

[54] SWING-OUT TIRE CARRIER
8 Claims, 7 Drawing Figs.

[52] U.S. Cl. ................................................. 214/451
[51] Int. Cl. ................................................. B62d 43/04
[50] Field of Search........................................ 214/454,
451, 452, 453, 77; 224/42.21, 42.23

[56] References Cited
UNITED STATES PATENTS

| 3,485,399 | 12/1969 | Hebnes............................ | 214/454 |
| 3,223,263 | 12/1965 | Fielding.......................... | 214/454 |
| 2,563,810 | 8/1951 | Ballard........................... | 214/451 |
| 3,428,200 | 2/1969 | Graves et al..................... | 214/454 |

FOREIGN PATENTS

| 555,506 | 4/1958 | Canada .......................... | 214/42.23 |

*Primary Examiner*—Hugo O. Schulz
*Attorney*—Colton & Stone

ABSTRACT: The disclosure is directed to a vehicular tire carrier that is adapted to be mounted beneath the body of a vehicle and provide ready accessibility to the tire supported thereon.

The tire carrier includes upper and lower support arms which are mounted for limited vertical swinging movement relative to a vehicle undercarriage between upper and lower stable positions. The upper arm, which carries the tire, is pivotally supported by the lower arm for pivotal movement relative thereto between positions underlying and extending outwardly from the vehicle body. The rear end of the tire carrier includes an over center spring-biased mounting arrangement for positioning and supporting the arms in the extreme stable positions. In the lower stable position, the tire may be swung outwardly from beneath the vehicle for ready access.

3,547,289

PATENTED DEC 15 1970

INVENTOR
CHESTER R. STEELE

BY *Colton & Stone*

ATTORNEYS

PATENTED DEC 15 1970 3,547,289
SHEET 2 OF 2
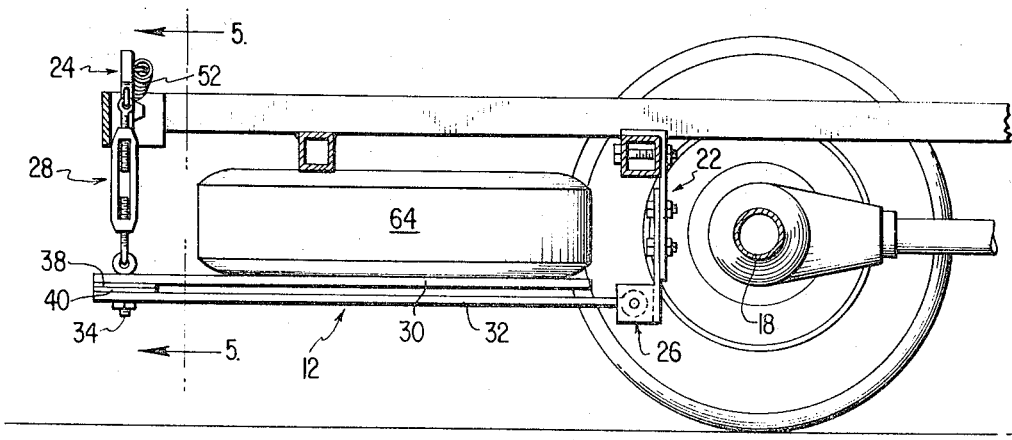
FIG. 3
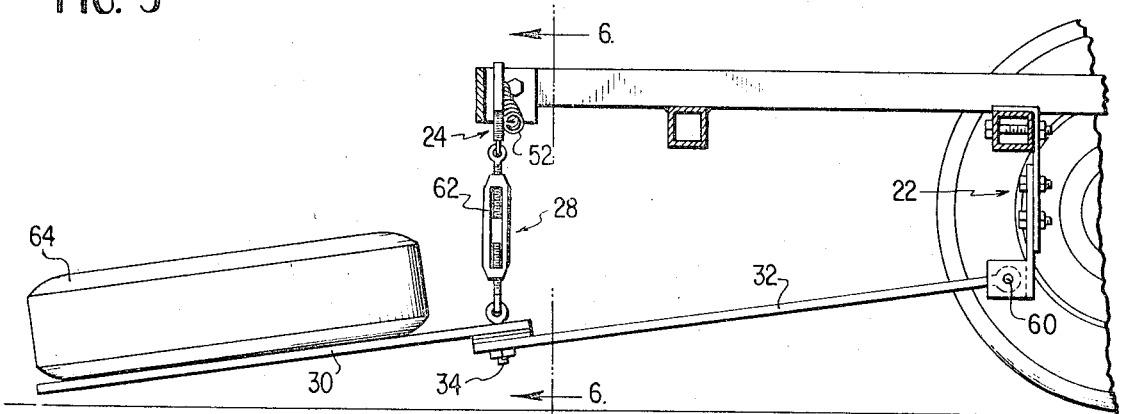
FIG. 4
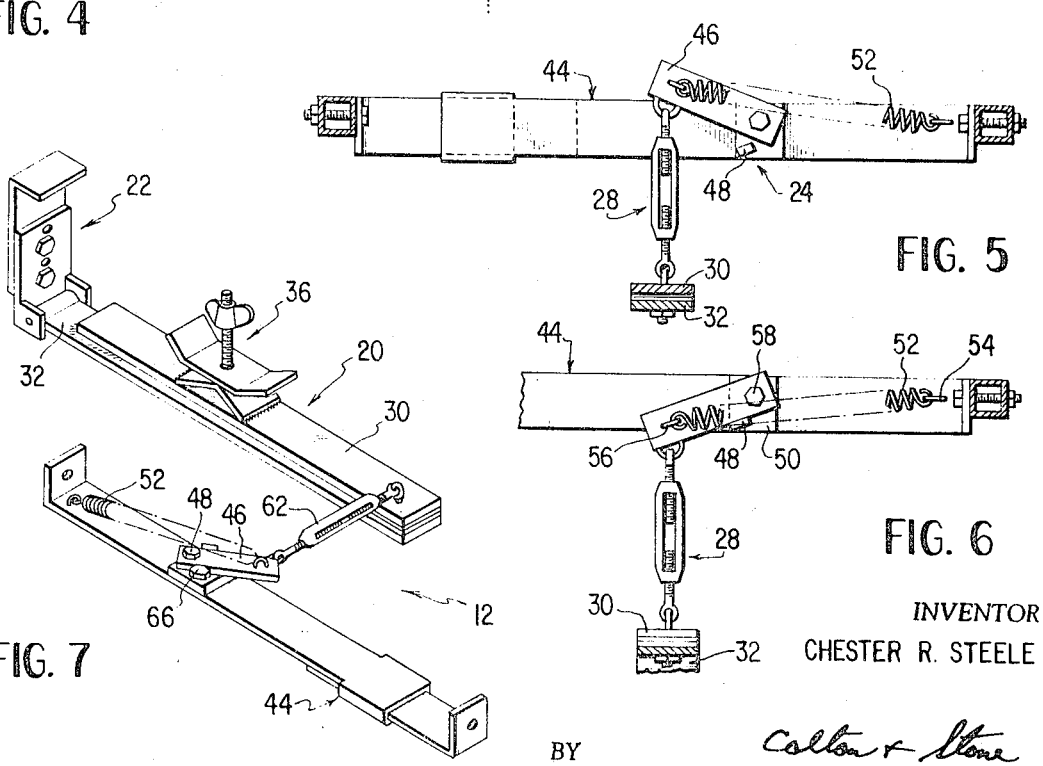
FIG. 5
FIG. 6
FIG. 7
INVENTOR
CHESTER R. STEELE
BY Colton + Stone
ATTORNEYS.

SWING-OUT TIRE CARRIER

CROSS-REFERENCE TO RELATED APPLICATION

This is a Continuation-in-Part application of copending Pat. application Ser. No. 681,670 filed Nov. 9, 1967 now U.S. Pat. No. 3,460,695, issued Aug. 12, 1969

BACKGROUND OF THE INVENTION

The invention relates to automotive tire carriers and more particularly to truck mounted tire carriers adapted to be mounted beneath a truck bed.

Many of the prior art tire carriers of the type supported beneath a truck bed have required an operator to crawl underneath the truck to remove the spare tire from its carrier which adds greatly to the time and effort involved in changing a tire. Other prior art tire carriers involve flexible connections between the tire and vehicle frame whereby the wheel may be lowered by operating a pulley or the like which, although an improvement over the first-mentioned class of tire carriers, still leaves the spare tire beneath the vehicle and requires the movement of an operator beneath the truck to remove the tire. Although swingout tire carriers have been previously suggested, as in U.S. Pat. No. 2,956,716, certain of these prior art carriers leave much to be desired in providing ready accessibility under all road conditions. Specifically, in some prior art swingout tire carriers, the same have possessed only limited degrees of outward swinging movement relative to the truck body on which they are mounted. This capability of limited outward swinging movement severely restricts ready accessibility to the tire under certain conditions such as unusual terrain or adverse road conditions. For example, the accessibility of a swingout tire carrier which swings out adjacent the right rear end of the truck would be somewhat impaired if the truck were stopped immediately adjacent a ditch, embankment or bridge rail on the right side of the road. Additionally, on dual highways, it may be necessary for a truck to pull off on the left side of the road to repair a flat tire. In this instance, a tire carrier which swings out to the right makes it necessary for the operator to assume a position in the face of oncoming traffic to remove the spare tire.

A further disadvantage in known swingout carriers, in addition to those described in the aforesaid copending application, is that the travel position of the same must be at a level below the truck undercarriage which lies within the path of the carrier's arcuate movement so as not to interfere with the outward swinging movement of the carrier. In conventional swingout carriers with which applicant is familiar, the bolt or other securing means which stabilizes the carrier in the travel position can only be reached by crawling underneath the truck since the same is normally positioned remote from the pivot axis which is, necessarily, adjacent the vehicle periphery.

SUMMARY OF THE INVENTION

A primary object of the invention is to eliminate the aforementioned disadvantages of conventional tire carriers and to provide a tire carrier that may be positioned for outward swinging movement by the application of foot pressure alone thus obviating the necessity of manipulating bolts or other securing means which results in a substantial saving in the time and effort normally associated with the changing of a tire. It is among the further objects of the invention to provide a tire carrier which is normally carried underneath the bed of a truck and which may be dropped down to permit a spare tire carried thereon to be swung out from underneath a truck to either side thereof; to provide a tire carrier that may be easily installed on virtually any type truck; to provide a tire carrier having a minimum of moving parts and in which the tire may be readily moved between its travel or carry position underneath the truck and a position beyond the vehicle periphery for easy handling; to provide a tire carrier that can be adjusted to accept any size hub and tire while providing for adjustment of the same to insure a snug fit of the tire and carrier against the underside of a truck and partly above the level thereof; and to provide securing means for the tire carrier which is adjacent the vehicle periphery so that the same may be released by the application of foot pressure.

DESCRIPTION OF THE DRAWINGS

FIG. 3 is a sectional elevational view taken along line 3–3 of FIG. 2 and illustrating additional undercarriage structure;

FIG. 4 is view similar to FIG. 3 but illustrating the spare tire in the dropdown, swingout position;

FIG. 5 is a sectional elevation taken along line 5–5 of FIG. 3;

FIG. 6 is a sectional elevation taken along line 6–6 of FIG. 4; and

FIG. 7 is a perspective view of the component parts making up the novel tire carrier, per se.

DESCRIPTION OF THE PREFERRED EMBODIMENT

Figure 1:
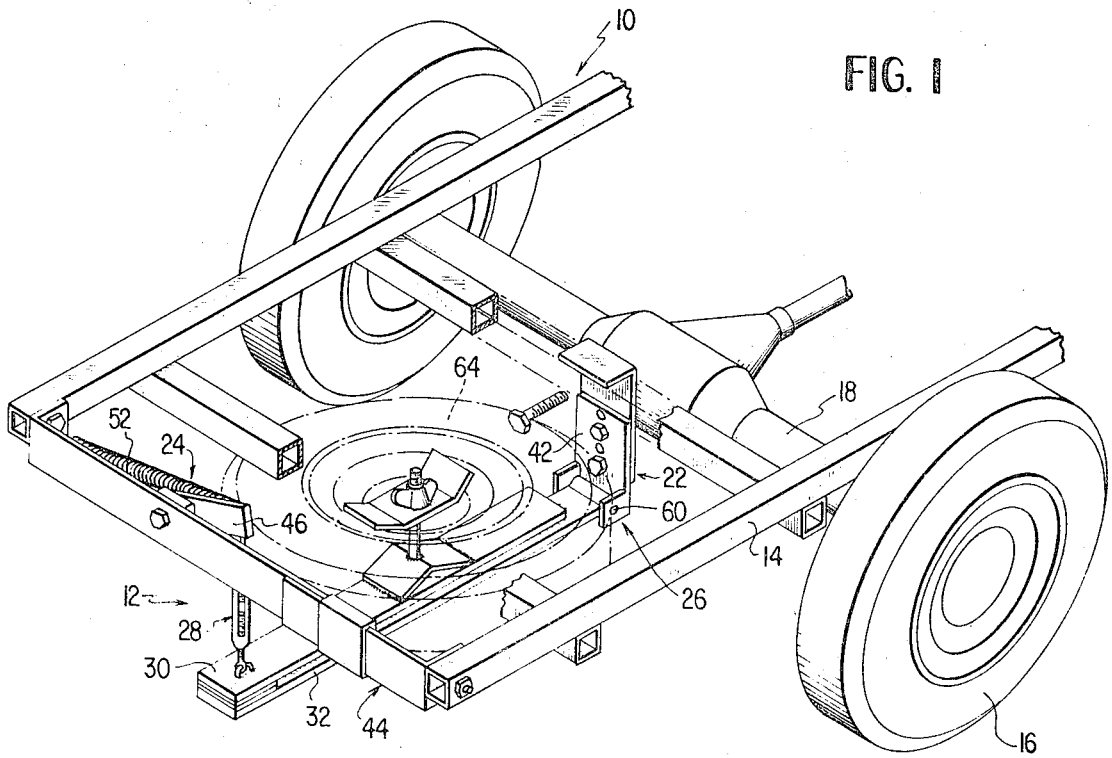
FIG. 1 is a fragmentary perspective view, partly broken away, of a truck undercarriage provided with a novel tire carrier according to the invention with the spare tire supported thereon being shown in phantom lines to facilitate the illustration of underlying structure.
Figure 2:
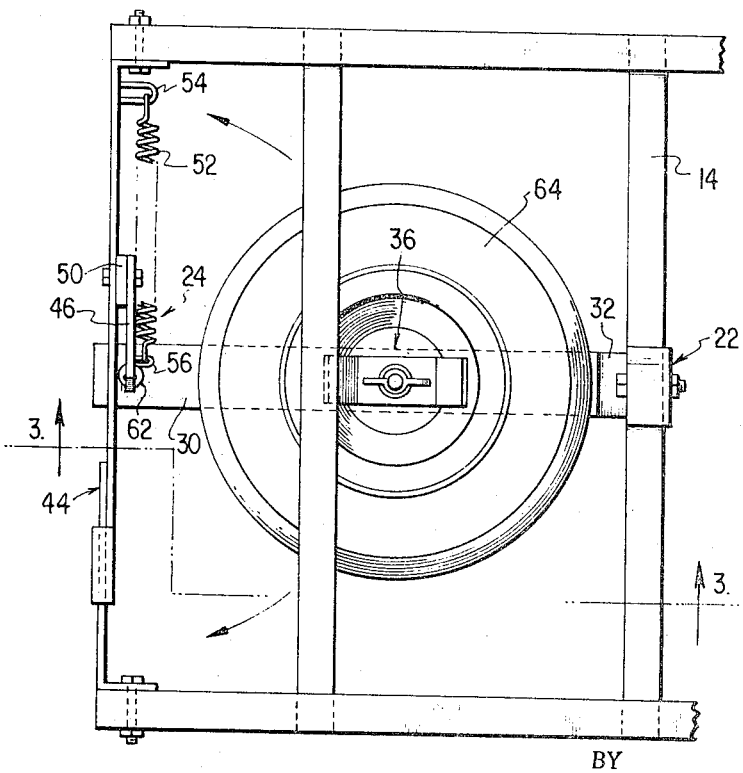
FIG. 2 is a top plan view of the structure shown in FIG. 1 broken away just rearwardly of the rear axle and showing the spare tire in solid lines.

A truck 10, provided with a tire carrier 12 embodying the invention, is fragmentarily illustrated in FIG. 1 as including frame members 14, rear wheels 16 and rear axle 18. Tire carrier 12 includes a tire rack 20, fore and aft mounting means 22, 24 and fore and aft connecting means 26, 28.

Tire rack 20 includes upper and lower arms 30, 32 pivotally interconnected by pivot pin 34, and a spare tire mounting attachment 36 extending upwardly from upper arm 30. The spare tire mounting attachment is spaced from the axis of pivot pin 34 by a distance exceeding the radius of a tire adapted to be carried thereon for a purpose that will become apparent from the ensuing description. Bearing plates 38, 40 may, if desired, be secured to the arms 30, 32, respectively.

Forward mounting means 22 comprises an adjustable bracket 42 adapted to be secured to the undersurface of vehicle 10 by attachment to frame structure 14 in any desired manner such as by bolting, welding or the like.

Rear mounting means 24 includes a longitudinally adjustable bracket 44 adapted to be secured between longitudinal framing members of frame structure 14. An actuating and positioning lever 46 is pivotally mounted on the forward face of bracket 44 for vertical swinging movement between a lower stable position abutting stop 48, as shown in FIG. 6, and an upper stable position shown in FIG. 5. A spacer plate 50, incorporating stop 48, is preferably interposed between the pivoted end of lever 46 and bracket 44 to preclude any possibility of binding between the free end of the lever and the bracket. A strong tension spring 52 interconnecting spring anchors 54, 56 provided on bracket 44 and the free end of lever 46, respectively, completes the rear mounting assembly. Spring anchors 54, 56 and lever pivot 58 are so positioned as to define an overcenter positioning arrangement wherein the axis of spring 52 passes above and below lever pivot 58 as the lever is positioned in the upper and lower stable positions, respectively.

Forward connecting means 26 comprises a pivot connection 60 interconnecting bracket 42 and the forward end of lower arm 32 whereby the free, or rear, end of lower arm 32 and the upper arm 30 supported thereon by pivot pin 34 may undergo vertical swinging movement between the upper and lower stable positions shown in FIGS. 5 and 6.

The rear connecting means 28 comprises a turnbuckle 62 interconnected between the free end of lever 46 and an eye on pivot pin 34.

In operation, spare tire 64 is secured to upper arm 30 by means of attachment 36 and the upper arm is rotated about pivot 34 into superposition with the lower arm. In the normal travel, or carry, position; spring 52 retains lever 46 in the upper stable position. The strength of spring 52 is sufficiently great to resist downward swinging movement of tire rack 20 and spare tire 64 about forward pivot connection 60 under normal travel conditions. Bracket 42 and turnbuckle 62 may be adjusted to accommodate different tire thicknesses so that, in the upper position of lever 46, spare tire 64 is held firmly against the vehicle undercarriage by the bias of spring 52. An upper stop, corresponding to lower stop 48, could be provided to limit the upper pivotal travel of lever 46, if desired, however the engagement of the spare tire with the vehicle undercarriage serves the same function of delimiting the upward movement of the lever under the actuating influence of spring 52 to define the upper stable position of the tire rack. A bolt 66 is removably mounted in a bolt hole extending through bracket 44 and plate 50 when the tire carrier is to be removed from the vehicle. Bolt 66 acts as an upper stop for lever 46 when the same is not restrained in its upward movement by engagement of a tire with the vehicle undercarriage.

When it is desired to gain access to the spare tire, the rear end of the tire rack is forced downwardly against the bias of spring 52, as by the application of foot pressure to the rear end of the tire rack, to force lever 46 into its over center lower position against stop 48. This is the dropdown position of the tire rack and the upper arm 30 may then be pivoted rearwardly about pivot 34 to expose the spare tire beyond the confines of the truck, as in FIGS. 4, where the same may be readily handled.

The mounting of a tire on the rack is accomplished by reversing the above steps. After securing the tire to upper arm 30 while the same is swungout beyond the confines of the vehicle, the upper arm is pivoted to its carry position overlying lower arm 32. A force is then exerted upwardly on lever 46 whereupon the lever moves over center to the upper stable position clamping the tire against the vehicle undercarriage where it is supported by the bias of spring 52.

It is, of course, obvious that the rear end of lower arm 32 could be extended further rearwardly beyond pivot 34 either to afford more leverage for manipulating the rack or to provide and attachment point for rear connecting means 28. In this latter event, where turnbuckle 62 would be connected to the lower arm at a point rearwardly of point 34, the upper arm would be limited to less than 360° of rotation about the pivot which would be somewhat less convenient than the arrangement depicted in the drawings.

I claim:

1. A dropdown, swingout tire carrier for automotive vehicles, comprising: upper and lower support arms; pivot means interconnecting said arms adjacent respective end portions thereof for relative pivotal movement; tire mounting means secured to one of said arms in spaced relation to said pivot means; mounting means interconnected with opposite end portions of the other of said arms for mounting the same on a vehicle frame for vertical movement relative thereto; one of said mounting means including stop means for limiting the downward movement of one end portion of said other arm relative to a vehicle frame on which the same is adapted to be mounted; and said one mounting means further including actuating means for positioning and supporting said one end portion of said other arm in one of two vertically spaced stable positions relative to a vehicle frame on which the same is adapted to be mounted, whereby an automotive tire may be selectively stably supported in a carry position immediately adjacent the undersurface of a vehicle frame and a dropdown position vertically spaced from the vehicle frame.

2. The tire carrier of claim 1 wherein said one mounting means includes adjustable support means adapted for securement to variably dimensioned automotive frames.

3. The tire carrier of claim 1 wherein the interconnection of said one mounting means to said other arm extends through the axis of said pivot means whereby said arms may undergo 360° of relative movement.

4. The tire carrier of claim 1 wherein the other of said mounting means includes pivot means carried by the other end of said other arm to constrain said relative vertical movement to pivotal movement.

5. The tire carrier of claim 4 wherein: said actuating means includes a pivotally mounted lever for positioning and supporting said one end portion of said other arm in the lower stable position against said stop means; and a spring, coacting with said lever, for positioning and supporting said one end portion of said other arm in the upper stable position spaced from said stop means.

6. The tire carrier of claim 5 wherein the interconnection between said one mounting means and said one end portion of said other arm includes adjustable connecting means whereby the upper and lower stable positions may be vertically adjusted.

7. In combination with an automotive vehicle, a dropdown, swingout tire carrier, comprising: upper and lower support arms; pivot means interconnecting said arms adjacent respective end portions thereof for relative pivotal movement; tire-mounting means secured to one of said arms in spaced relation to said pivot means; mounting means interconnecting the opposite end portions of the other of said arms with the undercarriage of said vehicle for vertical movement relative thereto; one of said mounting means including stop means for limiting the downward movement of one end portion of said other arm relative to said vehicle undercarriage; and said one mounting means including a spring biased over center actuating means for positioning and supporting said one end portion of said other arm in one of two vertically spaced stable positions relative to said vehicle undercarriage.

8. In combination with an automotive vehicle, a tire carrier, comprising: rack means including a tire-mounting attachment for mounting an automotive tire thereon; means mounting said rack means on said vehicle for vertical pivotal movement between two stable positions, said rack means including means mounting said tire-mounting attachment for swinging movement into and out of underlying relationship to the undercarriage of said vehicle for rendering a tire mounted thereon fully accessible in the latter position; and said second named means including means constantly interconnecting spaced portions of said rack means with said vehicle for supporting said rack in said stable positions.